(12) United States Patent
Malina et al.

(10) Patent No.: US 9,383,923 B1
(45) Date of Patent: Jul. 5, 2016

(54) WRITE POINTER MANAGEMENT FOR A DISK DRIVE

(71) Applicant: Western Digital Technologies, Inc., Irvine, CA (US)

(72) Inventors: James N. Malina, Irvine, CA (US); Joo Peng Teh, Kuala Lumpur (MY); Sang Huynh, Yorba Linda, CA (US); Carl E. Barlow, Lake Forest, CA (US); Robert M. Fallone, Newport Beach, CA (US); William B. Boyle, Lake Forest, CA (US); Glenn Cheng, Kuala Lumpur (MY); Kuang Hwa Teo, Puchong (MY); Peng Lee Liang, Subang Jaya (MY); Daniel D. Reno, Morgan Hill, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 691 days.

(21) Appl. No.: 13/662,353

(22) Filed: Oct. 26, 2012

Related U.S. Application Data

(60) Provisional application No. 61/715,698, filed on Oct. 18, 2012.

(51) Int. Cl.
  *G06F 13/00* (2006.01)
  *G06F 13/28* (2006.01)
  *G06F 3/06* (2006.01)
  *G11B 20/12* (2006.01)

(52) U.S. Cl.
  CPC .......... *G06F 3/0608* (2013.01); *G11B 20/1217* (2013.01)

(58) Field of Classification Search
  CPC ................................ G11B 5/012; G06F 3/064
  See application file for complete search history.

(56) References Cited

U.S. PATENT DOCUMENTS

| | | |
|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |

(Continued)

OTHER PUBLICATIONS

Suresh, Anand, Garth Gibson, and Greg Ganger. "Shingled Magnetic Recording for Big Data Applications." (2012), Parallel Data Laboratory Carnegie Mellon University.*

(Continued)

*Primary Examiner* — Eric S Cardwell

(57) ABSTRACT

Write pointer management for a disk drive including a disk having a plurality of sectors and a non-volatile memory (NVM) for storing data. Data is sequentially written sector by sector on the disk. The data written in a sector includes a write status indicator indicating that data has been written in the sector. A write pointer is stored on the disk or the NVM as a check-pointed write pointer. The write pointer corresponds to a current sector for writing data on the disk. During a write pointer recovery process, the check-pointed write pointer is retrieved, and at least one write status indicator is scanned in a range of sectors from the sector corresponding to the retrieved check-pointed write pointer and a last sector to identify the current sector for writing data. The write pointer is set to correspond to the identified current sector.

37 Claims, 11 Drawing Sheets

(56) References Cited

U.S. PATENT DOCUMENTS

| | | |
|---|---|---|
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |

(56) References Cited

U.S. PATENT DOCUMENTS

| | | |
|---|---|---|
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,007 B2 | 7/2006 | Liu et al. |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |

(56) References Cited

U.S. PATENT DOCUMENTS

| | | |
|---|---|---|
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,892,817 B2 | 11/2014 | Bandic et al. |
| 2003/0044170 A1 | 3/2003 | Haddad et al. |
| 2005/0231846 A1 | 10/2005 | Winarski et al. |
| 2007/0174582 A1 | 7/2007 | Feldman |
| 2009/0113702 A1 | 5/2009 | Hogg |
| 2010/0205623 A1 | 8/2010 | Molaro et al. |
| 2010/0306551 A1 | 12/2010 | Meyer et al. |
| 2011/0197035 A1* | 8/2011 | Na et al. .................. 711/154 |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

Anand Suresh, et al., "Shingled Magnetic Recording For Big Data Applications," Parallel Data Laboratory Carnegie Mellon University, Pittsburgh, PA, May 2012, pp. 1-29.

\* cited by examiner

WRITE POINTER MANAGEMENT FOR A DISK DRIVE

CROSS-REFERENCE TO RELATED APPLICATIONS

This application claims the benefit of U.S. Provisional Application No. 61/715,698, filed on Oct. 18, 2012, the disclosure of which is hereby incorporated by reference.

BACKGROUND

Disk drives are often used to record data onto or to reproduce data from a recording media. A disk drive can include a rotating magnetic disk and a head actuated over the disk to magnetically write data to and read data from the disk. The disk includes a plurality of radially spaced, concentric tracks for recording data.

The storage device industry is always trying to increase the recording density of the disk, or in other words, the amount of data that can be stored in a given area on the disk. Shingled magnetic recording (SMR) has recently been introduced as a way of increasing the number of tracks per inch (TPI) by making the tracks narrower. Since it is technologically easier to read narrow tracks than to write narrow tracks, SMR increases TPI by using a relatively wide shingle write head with a stronger magnetic field to overlap tracks like roof shingles. The non-overlapping portion then serves as a narrow track that can be read by a narrower read head.

Although a higher number of TPI is ordinarily possible with SMR, the overlap in tracks can create a problem when writing data since new writes to a previously overlapped track affects data written in the overlapping track. For this reason, tracks are usually sequentially written to avoid affecting previously written data. Such sequential writing involves identifying a proper location for writing new data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment

Figure 1:
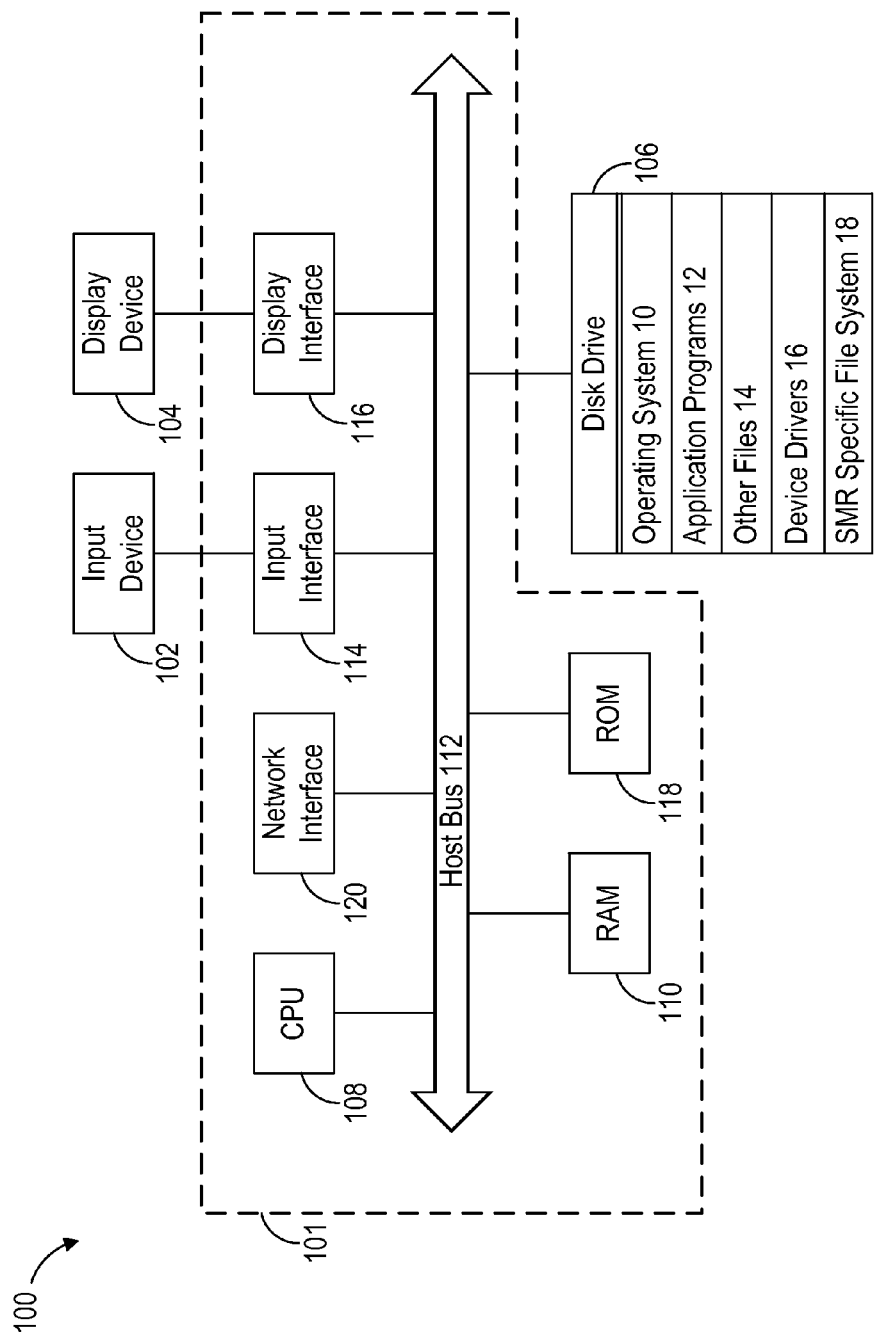
FIG. 1 is a block diagram depicting a computer system including a disk drive according to an embodiment.

FIG. 1 shows computer system 100 which includes host 101, input device 102, display device 104 and disk drive 106. Computer system 100 can be, for example, a cloud storage device, personal computer system, or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 104, read only memory (ROM) 118, network interface 120 and disk drive 106.

RAM 110 interfaces with host bus 112 so as to provide information stored in RAM 110 to CPU 108 during execution of instructions in software programs such as operating system 10, application programs 12, and device drivers 16. More specifically, CPU 108 first loads computer-executable instructions from disk drive 106 or another storage device into a region of RAM 110. CPU 108 can then execute the stored process instructions from RAM 110. Data such as data to be written to disk drive 106 or data read from disk drive 106 can be stored in RAM 110 so that the data can be accessed by CPU 108 during execution of software programs to the extent that such software programs have a need to access and/or modify the data.

As shown in FIG. 1, disk drive 106 includes application programs 12, which can include, for example, a word processing program or a multimedia program. In addition, disk drive 106 includes other files 14 and device drivers 16 for software interfaces to devices such as input device 102, display device 104 and/or disk drive 106. In some embodiments, disk drive 106 can include more or less than those elements shown in FIG. 1.

SMR specific file system 18 can be a file system for managing data for SMR media in disk drive 106. In this regard, disk drive 106 includes at least one disk (i.e., disk 200 shown in FIG. 2) having overlapping SMR tracks. In one embodiment, SMR specific file system 18 is used to perform write pointer management as described below. In other embodiments, SMR specific file system 18 can be configured as a part of a device driver, or as a stand-alone application program. Those of ordinary skill in the art will appreciate that the present disclosure is not limited to these embodiments and that the disclosed processes for managing write pointers may be implemented in other environments for managing data stored on a disk drive.

Disk Drive Overview

Figure 2:
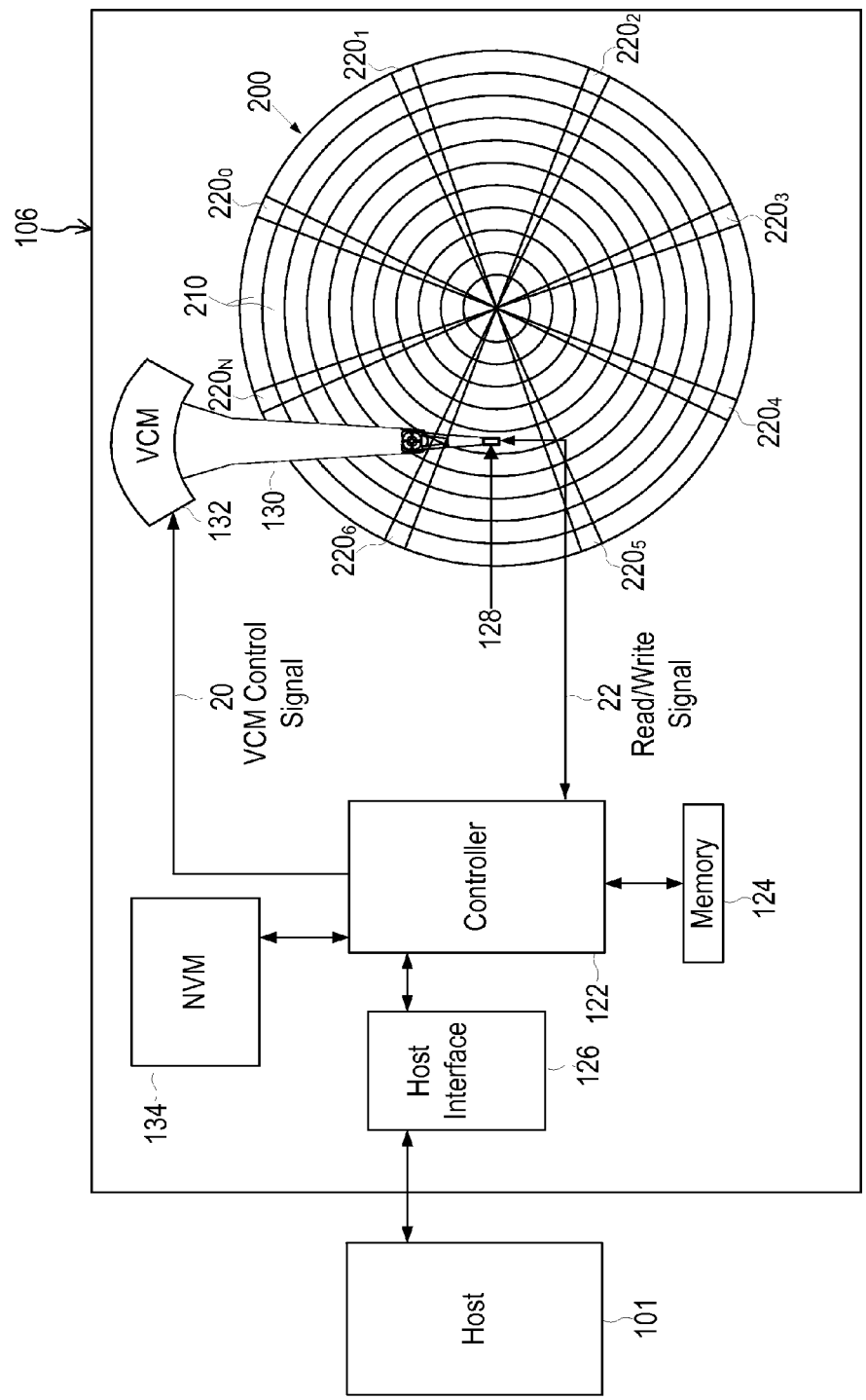
FIG. 2 is a block diagram depicting the disk drive of FIG. 1.

FIG. 2 illustrates a block diagram of disk drive 106 according to one example embodiment. As shown in FIG. 2, disk drive 106 includes rotating magnetic disk 200 and head 128 connected to the distal end of actuator arm 130 which is rotated about a pivot by voice coil motor (VCM) 132 to position head 128 over disk 200. Head 128 includes at least a read element (i.e., read element 132 in FIG. 3) for reading data from disk 200, and a write element (i.e., write element 130 in FIG. 3) for writing data on disk 200. Disk drive 106 also includes a spindle motor (not shown) for rotating disk 200 during read/write operations.

As shown in FIG. 2, disk drive 106 includes controller 122 which can perform various operations of disk drive 106 described herein. Disk drive 106 also includes memory 124 and host interface 101. Memory 124 can include a volatile memory, such as DRAM, and/or a non-volatile memory for storing data. Data stored in memory 124 includes data read from disk 200, data to be written to disk 200, and/or instructions for controlling disk drive 106.

In addition, disk drive 106 includes non-volatile memory (NVM) 134 for storing data such as user data, instructions for controlling disk drive 106, and/or data pertaining to the operation of disk drive 106. While the description herein refers to NVM generally, it is understood that NVM may comprise one or more of various types of non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

Host interface 126 is configured to interface disk drive 106 with host 101 and may interface according to the serial advanced technology attachment (SATA) standard or other standards such as serial attached SCSI (SAS). As will be appreciated by those of ordinary skill in the art, host interface 126 can be included as part of controller 122.

Figure 3:
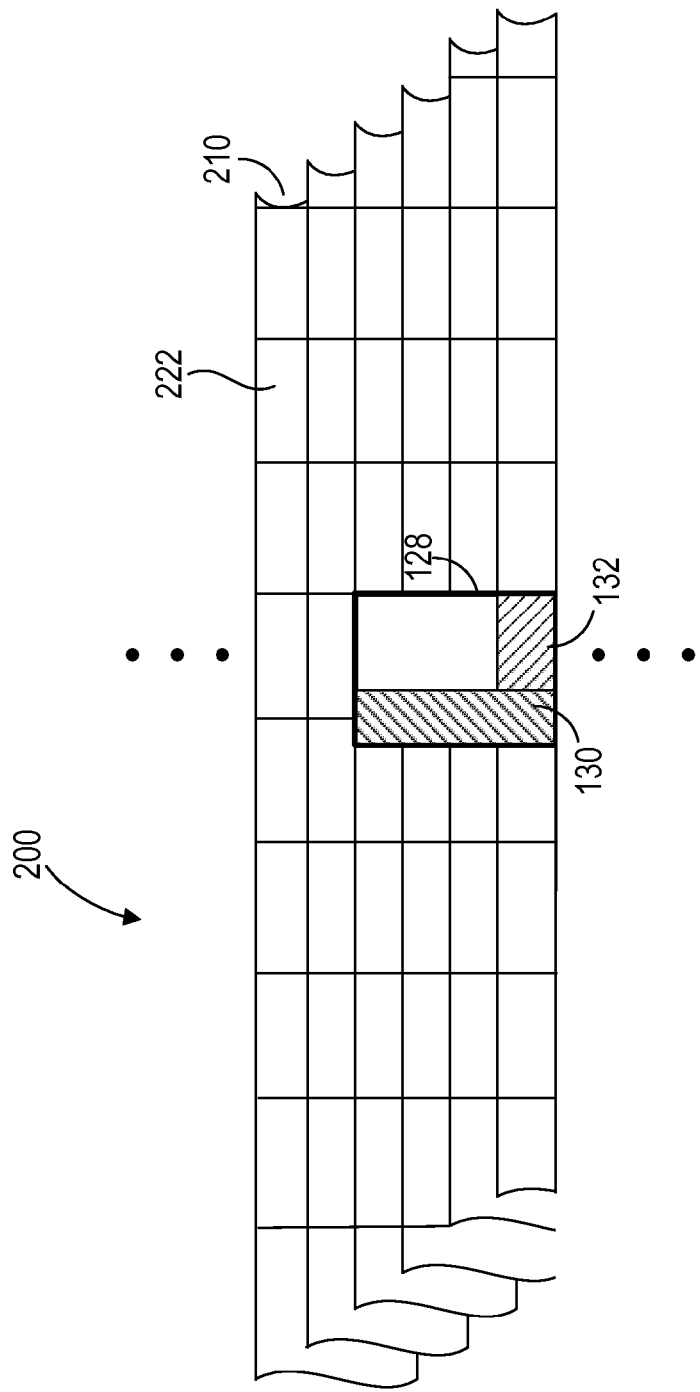
FIG. 3 illustrates a portion of a disk written by a head according to an embodiment.
Figure 4:
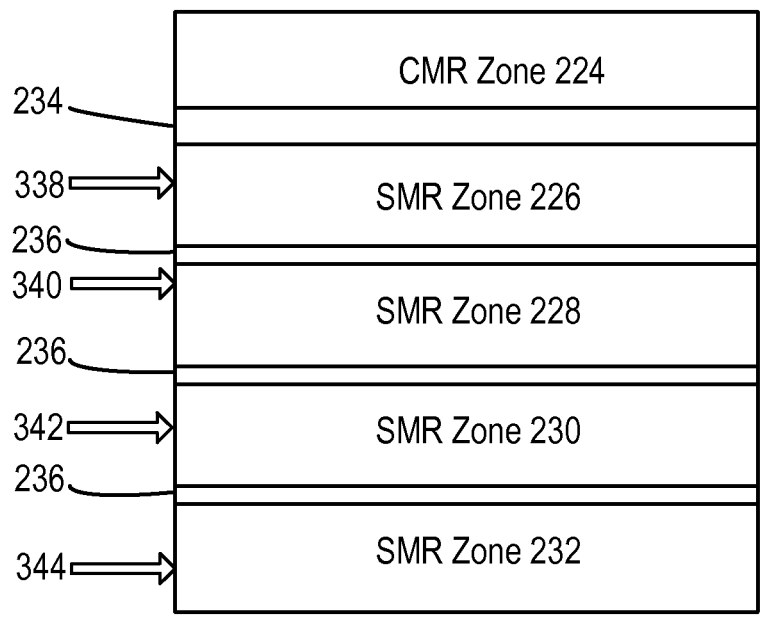
FIG. 4 illustrates a logical arrangement of zones on a disk according to an embodiment.

As an example, disk 200 comprises a number of radial spaced, concentric tracks 210, which can be grouped together into zones of tracks (e.g., zones 224, 226, 228, 230 and 232 in FIG. 4). Each track 210 is divided into a number of sectors (i.e., sectors 222 in FIG. 3) that are spaced circumferentially along tracks 210. The sectors may be used to store user data and/or other information. Disk 200 also includes a plurality of angularly spaced servo wedges $220_0$-$220_N$, each of which may include embedded servo information that can be read from disk 200 by head 128 to determine the position of head 128 over disk 200. For example, each servo wedge $220_0$-$220_N$ may include a pattern of alternating magnetic transitions (servo burst), which may be read from disk 200 by head 128 and processed by controller 122 to estimate the position of head 128 relative to disk 200. The angular spacing between servo wedges $220_0$-$220_N$ may be uniform, as shown in the example of FIG. 2.

In operation, controller 122 writes data to and reads data from disk 200 in response to commands from host 101 received via host interface 126. When controller 122 receives a write command from host 101 with data to be written to disk 200, controller 122 temporarily holds the received data in memory 124. To write data to disk 200, controller 122 positions head 128 on disk 200 by sending VCM control signal 20 (e.g., control current) to VCM 132. Controller 122 positions head 128 based on position information read from one or more servo wedges $220_0$-$220_N$. Controller 122 processes data to be written to disk 200 into write signal 22, which is output to head 128. For its part, a write element (shown as write element 130 in FIG. 3) of head 128 converts write signal 22 into a magnetic field that magnetizes the surface of the disk 200 based upon write signal 22, thereby magnetically writing data to disk 200. Controller 122 may notify host 101 via host interface 126 after data for the write command has been successfully written to disk 200.

When controller 122 receives a read command from host 101, requesting data written on disk 200, controller 122 positions head 128 on disk 200 by sending VCM control signal 20 to VCM 132. A read element (shown as read element 132 in FIG. 3) of head 128 generates read signal 22 based upon the magnetization of the disk surface under head 128, and controller 122 processes read signal 22 into data.

Shingled Writing Example with Write Pointers

FIG. 3 illustrates a portion of disk 200 written by head 128 according to an embodiment. To increase the data storage capacity of disk 200, disk drive 106 has the capability to write data to disk 200 using SMR so that tracks on disk 200 overlap. More specifically, write element 130 of head 128 is adapted for SMR which means that, among other things, it is wider than read element 132 of head 128. The non-overlapping portions of the overlapping tracks serve as narrow tracks 210 that can be read by narrower read element 132 of head 128. In addition to overlapping SMR tracks 210, FIG. 3 also includes sectors 222 for storing a fixed amount of data, such as 2,048 bits, 1,024 bits or 4,096 bits.

FIG. 4 illustrates an example of a logical arrangement of zones of tracks on disk 200. In the example of FIG. 4, there are four zones of overlapping SMR tracks, namely, SMR zones 226, 228, 230 and 232. In addition, FIG. 4 includes one zone of non-overlapping tracks in conventional magnetic recording (CMR) zone 224 and gaps 234 and 236 for separating each of the zones.

As shown in FIG. 4, each of the SMR zones has a write pointer indicated with an arrow. SMR zone 226 has write pointer 338, SMR zone 228 has write pointer 340, SMR zone 230 has write pointer 342, and SMR zone 232 has write pointer 344. These write pointers can be used to facilitate sequential writing of SMR zones 226, 228, 230 and 232, respectively. Write pointers 338, 340, 342 and 344 identify current sectors for sequentially writing data in their respective zones. The current sectors are specific sectors 222 following sectors where data was last written in their respective zones. When a new write command is received by disk drive 106, controller 122 can control VCM 132 to position write element 130 so that writing occurs in a current sector identified by the write pointer.

In one embodiment, if disk drive 106 receives a write command for an address such as a logical block address (LBA) corresponding to an area of disk 200 before the current sector, controller 122 notifies host 101 of a write error since this area of disk 200 has already been written. In such an embodiment, controller 122 uses the write pointer to determine that the address corresponds to an area of disk 200 that has already been written. Controller 122 can then notify host 101 of a write error instead of writing the data so as to avoid inadvertently overwriting valid data.

In addition to being used to facilitate sequential writing, the write pointers can also be used to prevent reading areas of the disk that have not been written. For example, host 101 may send a read command to disk drive 106 to read data at a particular LBA corresponding to an area of disk 200 that has not been written. In such a case, controller 122 can use the write pointer to determine that the address included in the read command corresponds to an area of disk 200 after the current sector and can notify host 101 of a read error.

Although write pointers are generally described below as being maintained and managed by disk drive 106, in some embodiments, host 101 can also maintain and manage the write pointers. For example, CPU 108 of host 101 can use SMR specific file system 18 and/or a different component stored in disk drive 106 to manage the write pointers. In one such embodiment, CPU 108 of host 101 can use SMR specific file system 18 or device drivers 16 to set LBAs as write pointers for SMR zones 226, 228, 230 and 232. In more detail, host 101 can send a command to controller 122 of disk drive 106 so that controller 122 sets a write pointer to a specific LBA.

In another embodiment, host 101 can send a command to controller 122 to disable use of the write pointer. Host 101 may send such a command when a zone previously designated as an SMR zone is designated by host 101 as part of a different zone. In such a situation, the write pointer may be disabled if new writes do not need to be sequential. Another example of when host 101 may send a command to disable a write pointer can be to perform a failure analysis of disk 200.

The write pointers for each SMR zone can be stored, for example, in memory 124, NVM 134 or on disk 200. If the write pointers are stored in a volatile memory, then the write pointers for each zone can be stored or check-pointed in a non-volatile memory such as NVM 134 or disk 200. More specifically, the write pointers can be stored in a reserved file, which is described in more detail below with reference to FIG. 5.

As will be appreciated by those of ordinary skill in the art, the arrangement of zones in FIG. 4 is merely one example arrangement of zones. Other arrangements of zones having different quantities and orders of SMR and CMR zones are possible without departing from the spirit and scope of the present disclosure.

Write Pointer Recovery Mechanisms

Figure 5:
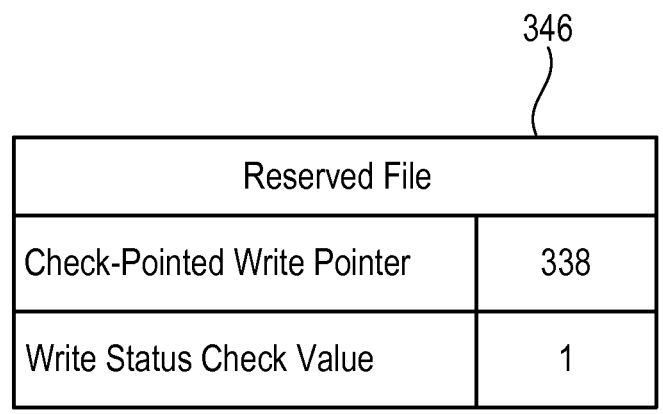
FIG. 5 depicts a reserved file according to an embodiment.

FIG. 5 depicts an example of reserved file 346 maintained by controller 122 in a non-volatile memory such as NVM 134 or disk 200. As discussed in more detail below with reference to FIG. 10, reserved file 346 can be used to recover a write pointer upon power-up of disk drive 106. In FIG. 5, reserved file 346 includes a check-pointed write pointer and a write status check value. The check-pointed write pointer corresponds to write pointer 338 for SMR zone 226 of FIG. 4. In practice, the check-pointed write pointer can be an LBA corresponding to a current sector in a particular zone or a current sector on a particular disk. Each SMR zone of FIG. 4 can have its own reserved file such as reserved file 346 or the zones may share a single reserved file for all of the zones.

Controller 122 can check-point the write pointer as a check-pointed write pointer when certain events occur. For example, controller 122 can store the write pointer as a check-pointed write pointer before writing data in a different zone, such as when switching from writing data in SMR zone 226 to writing data in SMR zone 230. Another example of when controller 122 may check-point or store the write pointer include each time a predetermined amount of data has been written, such as after each time 500 MB of data has been written. Controller 122 may also check-point the write pointer after a certain amount of time has elapsed or after a certain amount of time has elapsed while disk drive 106 is in an idle state, such as after one minute of idle time where disk drive 106 has not received any commands from host 101. Controller 122 may also check-point the write pointer when disk drive 106 encounters an error when writing data to disk 200, when a firmware for disk drive 106 is modified, or when disk drive 106 receives a host flush command from host 101 to write all data currently being managed by disk drive 106 into a non-volatile memory such as NVM 134 or disk 200.

By check-pointing the write pointer when certain events occur, it is ordinarily possible to reduce the amount of time required to identify a current sector for writing data after an unexpected power loss. In this regard, it is not necessary during a write pointer recovery process to scan all sectors in a zone or on a disk to identify a current sector. Instead, the number of sectors to scan can be reduced to a subset of sectors located at and beyond the sector corresponding to the check-pointed write pointer.

As shown in FIG. 5, reserved file 346 optionally includes a write status check value which can also be used by controller 122 during a write pointer recovery process. More specifically, the write status check value can be used by controller 122 with the check-pointed write pointer to identify a current sector after an unexpected power loss. An example of such a write pointer recovery process is described in more detail with reference to FIG. 10 below. In the example of FIG. 5, the write status check value of reserved file 346 is "1", which indicates that written sectors in SMR zone 226 include a write status indicator with a value of "1." Other values may be used to identify the current sector in other embodiments.

Write Status Indicators

Figure 6A:
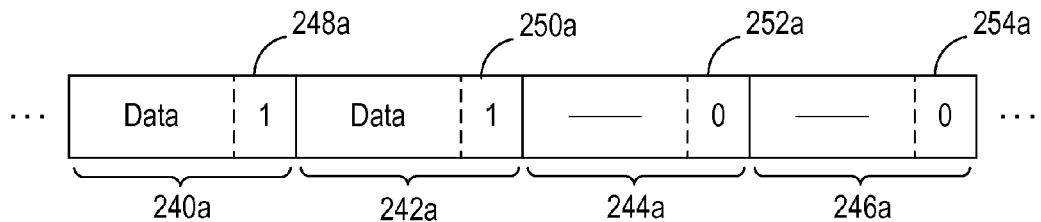
FIG. 6A illustrates sectors on a disk including write status indicators according to an embodiment.

FIGS. 6A to 6D illustrate different embodiments of write status indicators used to indicate whether data has been written in a sector. In the example of FIG. 6A, sectors 240a and 242a have been written with data, while sectors 252a and 254a have not been written with data. Write status indicators 248a and 250a have a value of "1" to indicate that data has been written in their sectors. On the other hand, write status indicators 252a and 254a have a value of "0" to indicate that data has not been written in their sectors. In this example, the current sector would be sector 244a since this is the next sector for sequentially writing data.

Figure 6B:
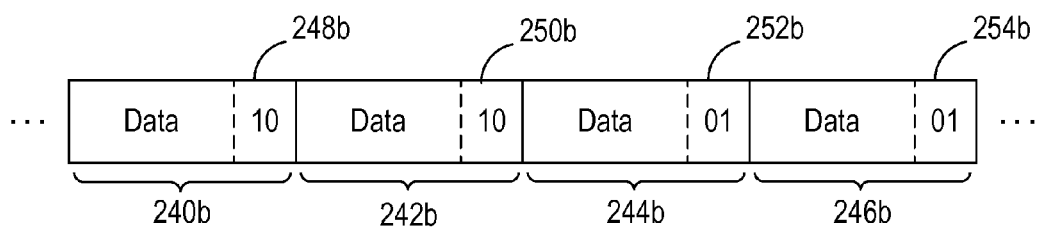
FIG. 6B illustrates sectors on a disk including write status indicators according to another embodiment.

In the example of FIG. 6B, data has been written in each of sectors 248b, 250b, 252b and 254b, but the data in sectors 244b and 246b is obsolete and is to be overwritten. If all of the data in a sequentially written zone is marked for deletion, the write pointer is reset to point to the first sector in the zone so that new data can be written over the obsolete data marked for deletion. Marking all of the data in a zone for deletion can be, for example, part of a read-modify-write process.

Each write status indicator in FIG. 6B has two bits for indicating a number of times its sector has been written. In the example of FIG. 6B, sectors 240b, 242b, 244b and 246b were written once before all of the data in the zone was marked for deletion. The write pointer was then reset to correspond to a first sector in the zone and writing resumed in a second write pass. As shown in FIG. 6B, the binary value of write status indicators 248b and 250b is "10", or a decimal value of 2, which indicates that sectors 240b and 242b have been written twice. In contrast, the binary value of write status indicators 252b and 254b is "01", or a decimal value of 1, which indicates that sectors 244b and 246b have been written once. In this example, sector 252b is the current sector since it is the next sector for sequentially writing data in the second write pass.

Figure 6C:
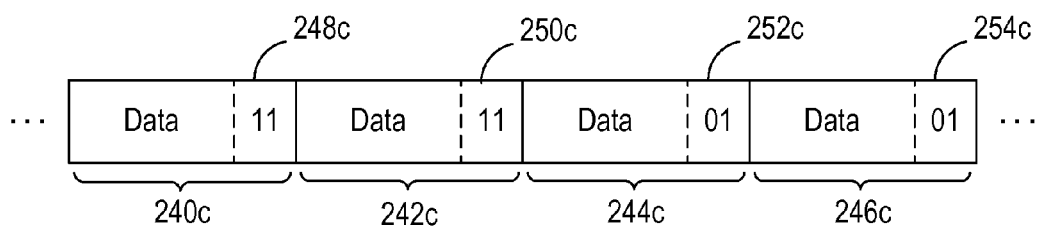
FIG. 6C illustrates sectors on a disk including write status indicators according to another embodiment.

FIG. 6C illustrates a different embodiment using write status indicators. As with the example of FIG. 6B, each write status indicator in FIG. 6C has two bits available for indicating the number of times its sector has been written. However, in FIG. 6C, each bit represents one write pass. In other words, a least significant bit is changed from "0" to "1" the first time a sector is written. In a next write pass, a next most significant bit is changed from "0" to "1" to indicate that the sector has been written a second time.

As shown in FIG. 6C, each of sectors 240c, 242c, 244c and 246c have been written once because the least significant bit for all of the write status indicators is "1." Only sectors 240c and 242c have been written a second time since the next most significant bit for write status indicators 248c and 250c is "1." Sectors 244c and 246c have not been written a second time because write status indicators 252c and 254c have a next most significant bit of "0." Accordingly, the current sector in the example of FIG. 6C is sector 244c since that is the next sector for sequential writing data in the second write pass.

Figure 6D:
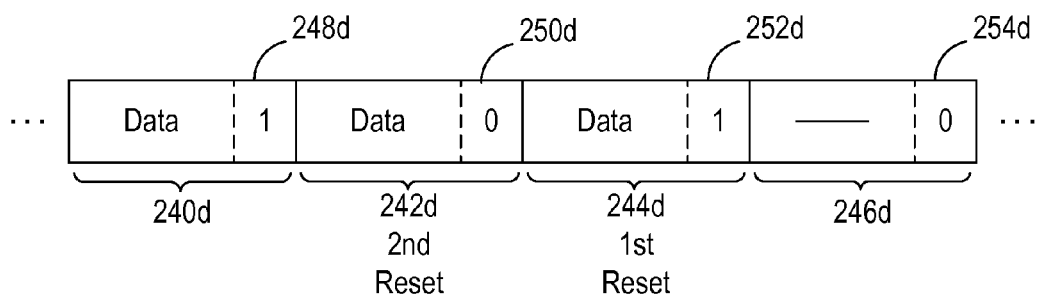
FIG. 6D illustrates sectors on a disk including write status indicators according to another embodiment.

FIG. 6D illustrates an embodiment of using write status indicators in combination with a reset history table. As with the write status indicators of FIG. 6A, the write status indicators of FIG. 6D (i.e., write status indicators 248d, 250d, 252d and 254d) are each one bit. When sectors 240d, 242d, 244d and 246d are written with data, the polarity of their write status indicators bit is reversed. In other words, the binary value of the write status indicator is flipped from "0" to "1" or from "1" to "0" each time data is written in a sector.

In the example of FIG. 6D, sector 246d has not been written with data, sector 244d has been written once, sector 242d has been written twice, sector 240d has been written three times. This situation can result from the write pointer being reset after writing data in sector 244d during a first write pass, and then the write pointer being reset a second time after writing data in sector 242d during a second write pass.

As shown in FIG. 6D, if the write pointer is reset before data is written to a last available sector, there will be a discontinuity in the values used to indicate whether data has been written in a particular sector. As discussed in more detail below, controller 122 can maintain a reset history table to accommodate binary searching of write status indicators so as to identify a current sector. The reset history table can include at least one reference address identifying where the write pointer was reset and a write status check value. By keeping track of where the write pointer was reset, it is possible to avoid a time consuming process of resetting single bit write status indicators to an initial value in each previously written sector.

Reset History Table

Figure 7:
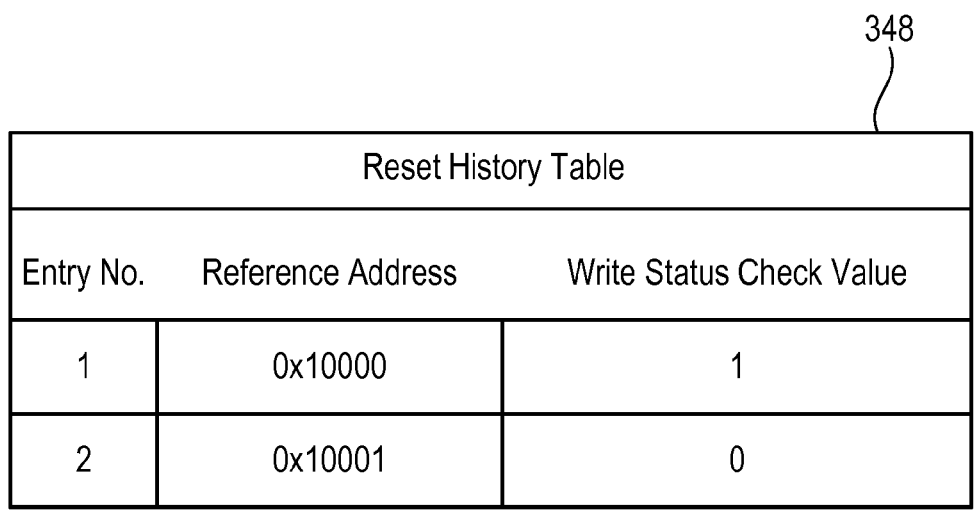
FIG. 7 depicts a reset history table according to an embodiment.

FIG. 7 depicts a reset history table based on the example of FIG. 6D. Reset history table 348 can be stored in a non-volatile memory such as NVM 134 or disk 200. Each zone (e.g., SMR zones 226, 228, 230 and 232) can have their own reset history table or one reset history table may be used for different zones.

In FIG. 7, each entry in reset history table 348 corresponds to an instance when the write pointer was reset in FIG. 6D. Reset history table 348 includes two entries, with each entry including a reference address and a write status check value. The reference address can be an LBA corresponding to the last written sector before the write pointer was reset. In FIG. 7, reference address 0x10000 corresponds to sector 242d of FIG. 6D which was the last written sector before the write pointer was reset the second time. Similarly, reference address 0x10001 corresponds to sector 244d which was the last written sector before the write pointer was reset the first time. In the example of FIG. 7, each write status check value is the value to be used after reset for write status indicators in written sectors at or before the reference address. As understood by those of ordinary skill in the art, different relationships between write status indicators, reference addresses, and write status check values are possible in other embodiments of reset history tables.

If maintaining a reset history table, controller 122 may not need to also maintain a write status check value in a reserved file since the write status check values of the reset history table can be used instead. In addition, the reserved file and the reset history table can be combined in a single file.

Example Write Process

Figure 8A:
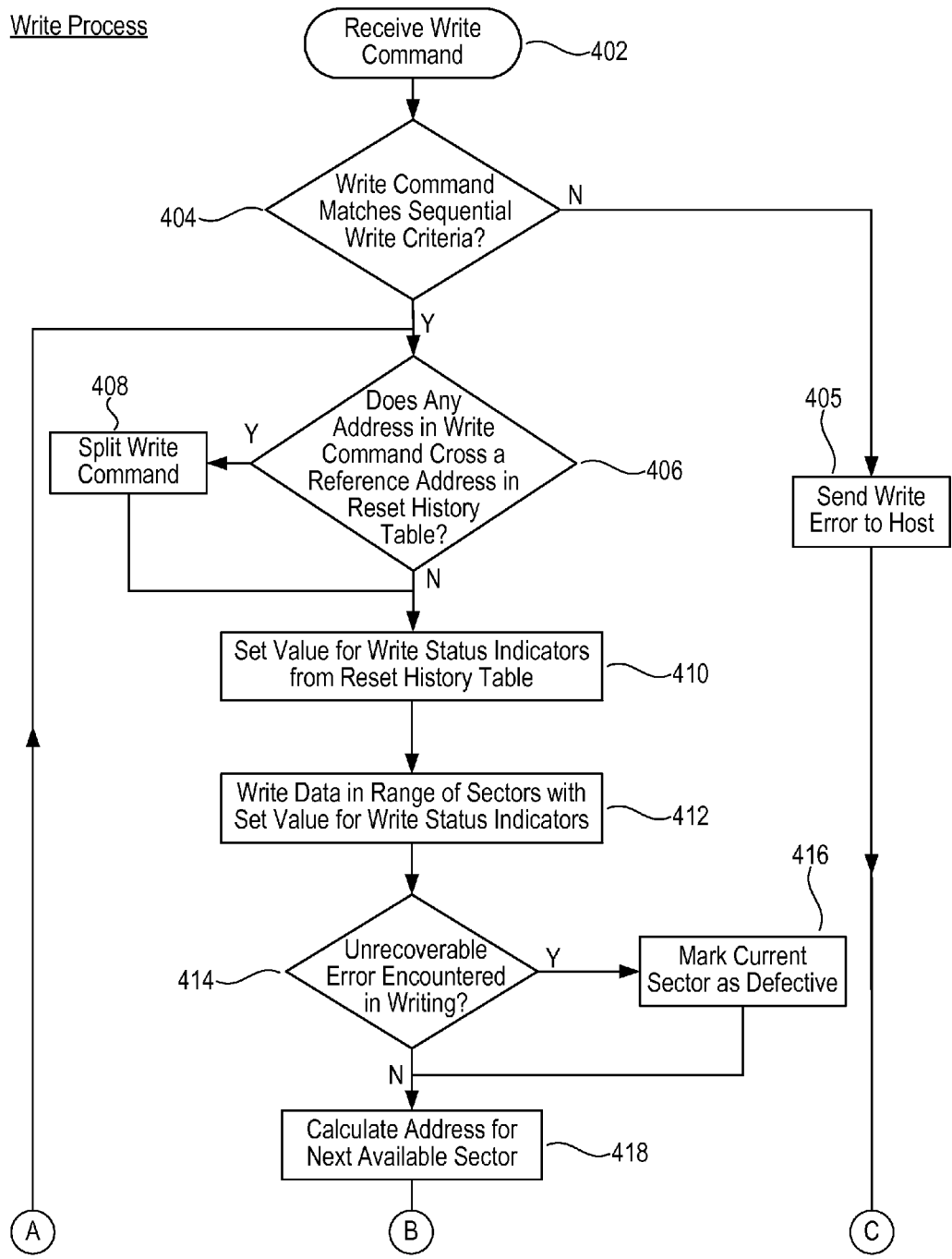
FIG. 8A is a flowchart for a write process according to an embodiment.
Figure 8B:
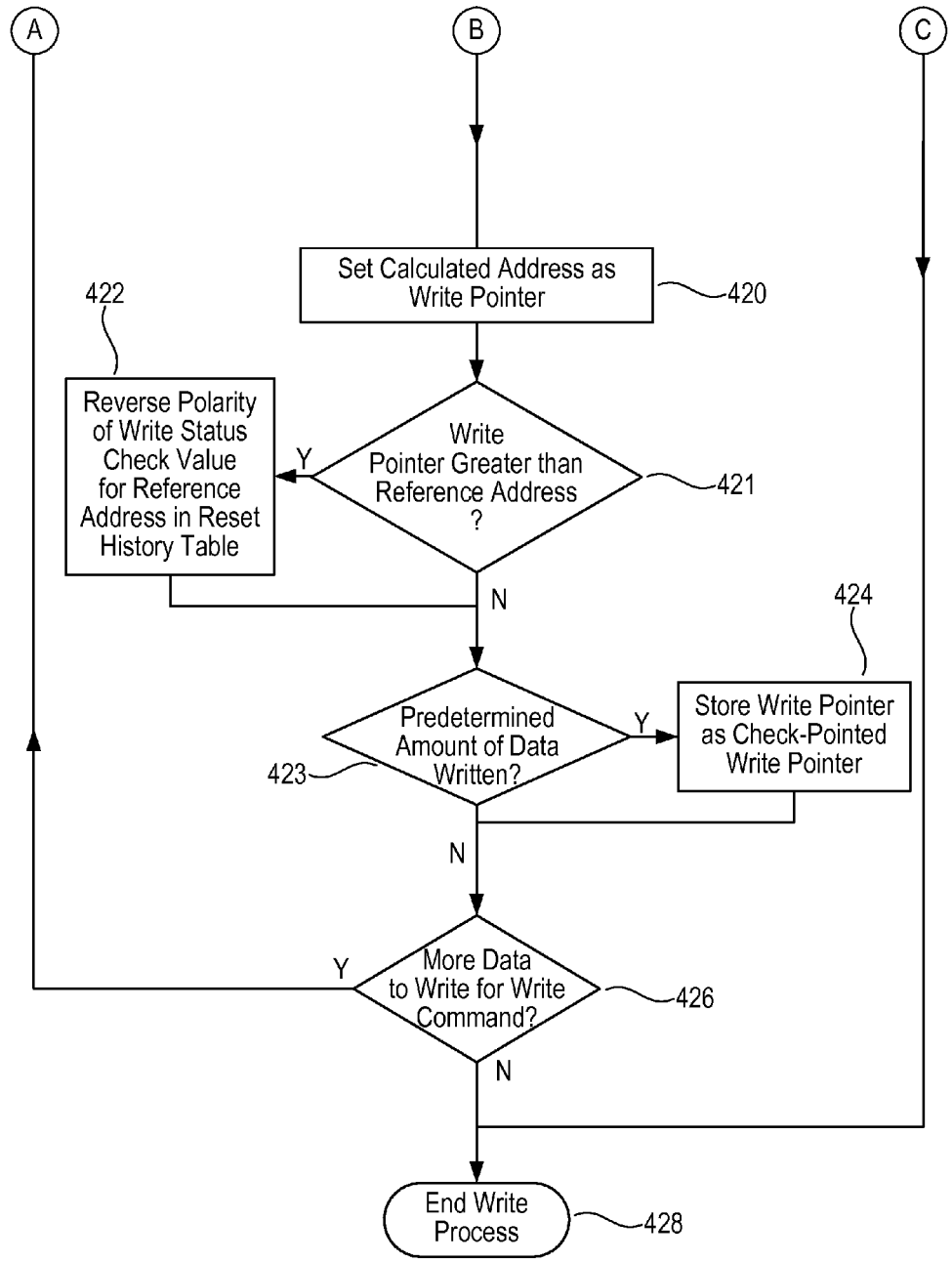
FIG. 8B is a second portion of the flowchart of FIG. 8A.

The flowchart of FIGS. 8A and 8B depict an example write process using a reset history table in accordance with FIGS. 6D and 7. In block 402, a write command is received by disk drive 106 from host 101. In block 404, controller 122 determines whether the received write command meets sequential write criteria. This check is performed to ensure the received write command begins at the correct address so that writing will begin at the correct sequential location. In one embodiment, controller 122 may check that a beginning LBA for the write command matches the write pointer. If the write command does not meet the sequential write criteria, controller 122 sends a write error to host 101 in block 405 and the write process ends in block 428.

On the other hand, if the write command meets the sequential write criteria in block 404, controller 122 checks reset history table 348 in block 406 to determine if any addresses in the write command cross a reference address in reset history table 348. More specifically, the determination in block 406 can be made by checking if an unwritten range of addresses for the write command are greater than a next reference address in reset history table 348. If so, this means that when writing data for the write command, the polarity of the write status indicators will start with one polarity and change to the opposite polarity after the next reference address.

If it is determined in block 406 that addresses in the write command cross a reference address, the process proceeds to block 408 where the received write command is split into two smaller write commands at the reference address. If there are multiple reference addresses within the range of addresses, controller 122 will split the received write command into two write commands at the first reference address within the range. In other embodiments, blocks 406 and 408 may be omitted and the values for the write status indicators can be set on the fly while writing an entire range of the received write command.

In block 410, controller 122 sets a value for write status indicators in the sectors to be written. In more detail, controller 122 sets the value for the write status indicators by comparing an address for the current sector (e.g., the write pointer) with the next reference address in reset history table 348. The write status check value associated with the next reference address after the address for the current sector can be used as the write status indicator in written sectors up to and including the reference address. If there are no next reference addresses in reset history table 348, a previously used value for the write status indicator can continue to be used to indicate a written sector. If there are no entries at all in reset history table 348, then this would indicate a first write pass and an initial value (e.g., "1") could be used as the write status indicator for written sectors.

In block 412, controller 122 controls head 128 to write data in a range of sectors corresponding to the write command. If the write command was split in block 408, data is written in a range of sectors corresponding to the first of the two ranges. The data written in a current sector in the range includes data from the received write command and the value set in block 410 for the write status indicator. In the example process of FIGS. 8A and 8B, the write status indicator is one bit, and each time a sector is written, the polarity of its write status indicator is reversed by writing the write status indicator with the value set in block 410.

If it is determined in block 414 that there is an unrecoverable error encountered in writing data in a current sector, controller 122 marks the current sector as defective in block 416. An unrecoverable error may occur after a predetermined number of write attempts have failed to write data to a particular sector or group of sectors. Such an unrecoverable error may occur when trying to write to a damaged sector. If there is not an unrecoverable error in writing data, controller 122 calculates an address (i.e., LBA) for a next available sector in block 418. This calculation can take into account sector data alignment for disk 200 and/or servo wedges 220.

In block 420, controller 122 sets the calculated address as the write pointer. If a next reference address was identified in block 406, controller 122 checks in block 421 if the write pointer set in block 420 is greater than the reference address. If so, this means that the polarity of the write status check value for the reference address should be reversed since write status indicators at and before the reference address now have the opposite value of the write status check value. In other words, sectors written in a next write pass will have write status indicators with the opposite value.

Reversing the polarity of the write status check value can be useful for performing a write pointer recovery process, such as the write pointer recovery process described with reference to FIG. 10 below. In such embodiments, determining whether a sector before the reference address has been written by a next write pass involves determining whether the value of a write status indicator has been changed since a previous write pass or changed from an initial value. For example, if all of the write status indicators up to and including a reference address have been switched from "0" to "1", determining whether a sector has been written during a next write pass involves determining whether a write status indicator has been switched back to "0" from "1". While a zone can potentially have multiple thousands of sectors, the use of write status indicators as described ordinarily allows the current sector to be identified with relative ease through a quick scan of the write status indicators.

If it is determined in block 421 that the write pointer is greater than the reference address, controller 122 in block 422 reverses the polarity of the write status check value for the corresponding reference address in reset history table 348.

In block 423, controller 122 determines whether a predetermined amount of data has been written for the purpose of check-pointing the write pointer. If controller 122 determines that the predetermined amount of data has been written, such as 500 MB of data, controller 122 stores the write pointer in block 424 as a check-pointed write pointer in a reserved file stored in NVM 134 or on disk 200. Controller 122 may also report the check-pointed write pointer to host 101 via host interface 126. In this regard, the write pointer reported to host 101 can be an LBA corresponding to the write pointer.

In block 426, controller 122 determines whether there is more data to write for the write command received in block 402. More specifically, there may be more data to write if the received write command was split in block 408. If so, the write process returns to block 406 to determine if any addresses in the unwritten range are greater than a next reference address. If it is determined in block 426 that there is no more data to write for the received write command, the write process ends in block 428.

Example Write Pointer Reset Process

Figure 9:
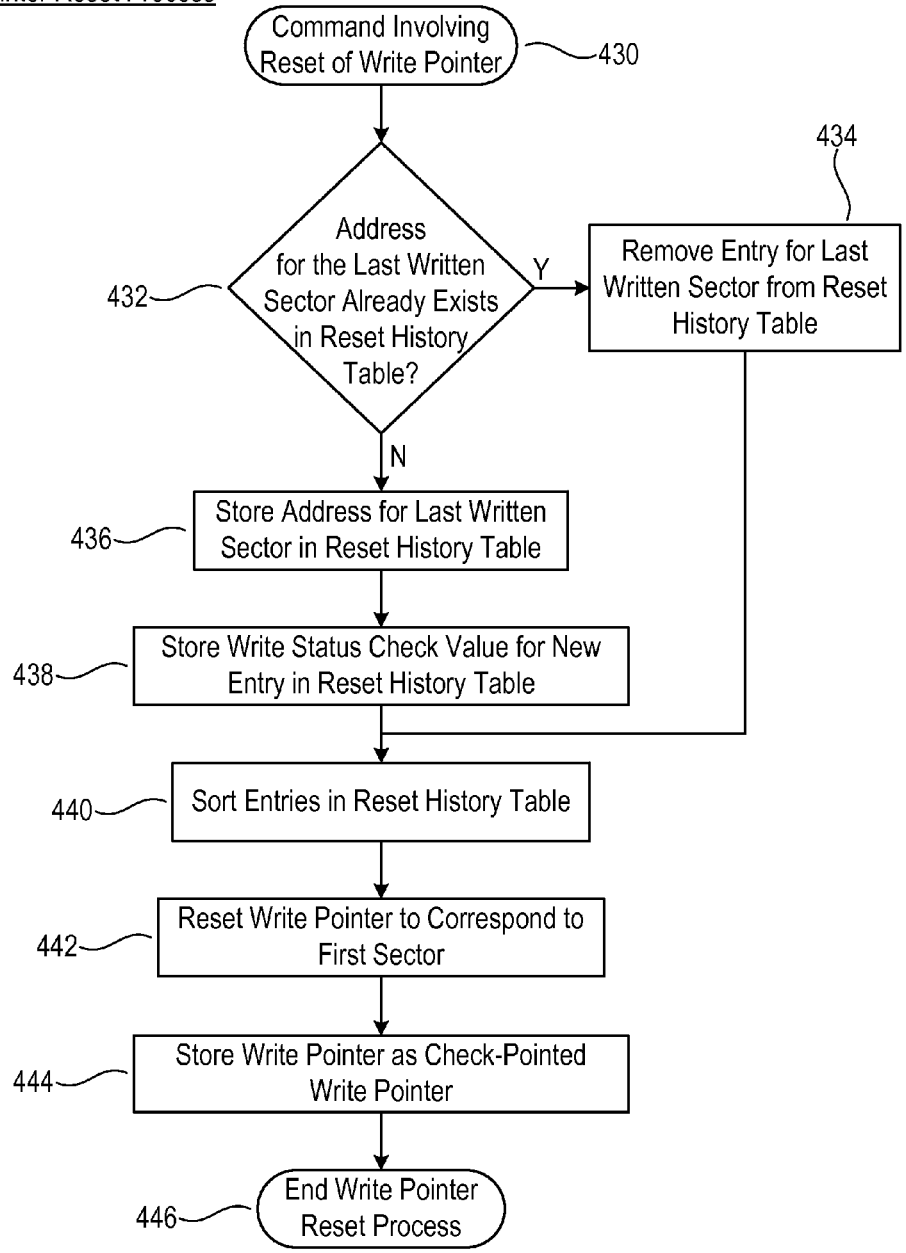
FIG. 9 is a flowchart for a write pointer reset process according to an embodiment.

FIG. 9 is a flowchart for an example write pointer reset process that can be performed for an individual zone on disk 200, such as SMR zones 226, 228, 230 or 232. The process begins in block 430 with a command involving the reset of a write pointer. Such a command can be, for example, a command received from host 101 to delete all of the data in a particular zone on disk 210, part of a read-modify-write operation, or part of a garbage collection process performed by SMR specific file system 18.

In block 432, controller 122 determines whether a reference address for the last written sector already exists in reset history table 348. If so, the entry for that reference address is removed from reset history table 348 in block 434 to cancel out the previous entry for the reference address. If the address for the last written sector is not already in reset history table 348, controller 122 in block 436 stores the address of the last written sector as a reference address for a new entry in reset history table 348.

In block 438, controller 122 stores a write status check value in the new entry. More specifically, controller 122 stores the opposite value of the write status indicator of the last written sector since this value will be used to indicate a written sector in the next write pass. In block 440, controller 122 sorts the entries in reset history table 348 in order of increasing reference addresses. This sorting facilitates quicker searching of reset history table 348 during a write process and during a write pointer recovery process.

In block 442, controller 122 resets the write pointer to an address (e.g., LBA) for a first sector on disk 200 or to an address for a first sector in a particular zone on disk 200.

Controller 122 optionally stores the write pointer as reset in block 442 as a check-pointed write pointer in a reserved file. Controller 122 may also optionally report the check-pointed write pointer to host 101 via host interface 126. The write pointer reset process then ends in block 446.

Example Write Pointer Recovery Process

Figure 10:
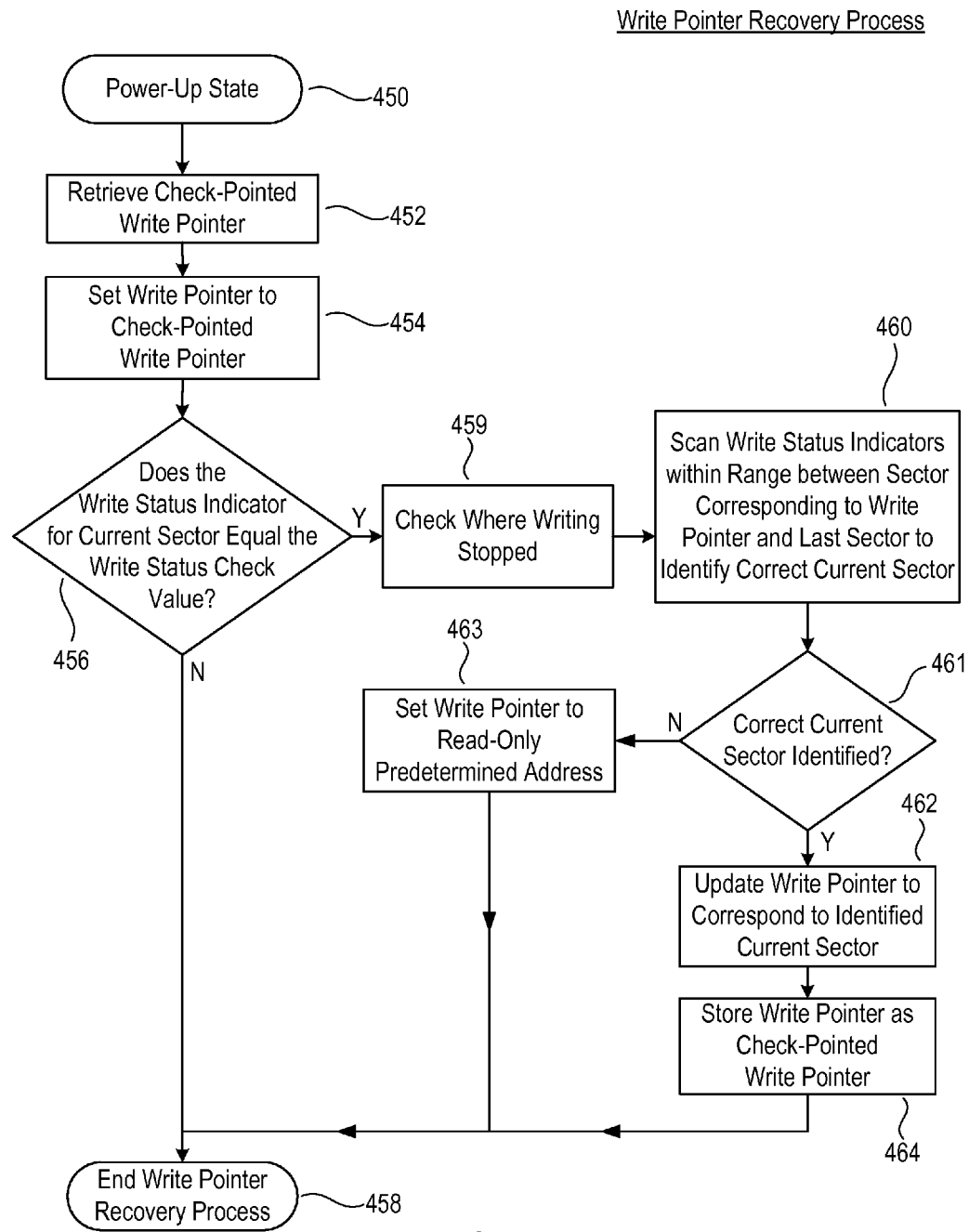
FIG. 10 is a flowchart for a write pointer recovery process according to an embodiment.

FIG. 10 is a flowchart depicting an example write pointer recovery process. In the example of FIG. 10, the write pointer recovery process begins when disk drive 106 is powered-up after either a controlled power-down of disk drive 106 or after an unexpected power loss of disk drive 106. In other embodiments, this process may only be performed if there is an indication of an unexpected power-loss. For such embodiments, it is presumed that controller 122 properly stores the write pointer during a controlled power-down of disk drive 106.

The process of FIG. 10 can be performed to recover a write pointer for a single zone on disk 200 or for multiple zones on disk 200. For example, if disk 200 includes the zones of FIG. 4, the process of FIG. 10 can be performed for each zone having a write pointer, i.e., SMR zones 226, 228, 230 and 232.

In block 452, controller 122 retrieves the check-pointed write pointer from reserved file 346 stored in NVM 134 or on disk 200. Controller 122 sets the write pointer to the check-pointed write pointer retrieved in block 452. Controller 122 may also optionally report the retrieved check-pointed write pointer to host 101 via host interface 126.

In situations where the check-pointed write pointer is not retrievable, controller 122 may set the write pointer to a predetermined address as a safety measure to reduce the likelihood of disk drive 106 from overwriting valid data when the check-pointed write pointer is not retrievable. The predetermined address can correspond, for example, to a last available sector in a zone or on a disk, or to a simulated sector beyond the last available sector. By setting the write pointer to such a predetermined address, the zone or disk can become read-only.

In block 456, controller 122 determines whether the write status indicator in the current sector pointed to by the write pointer equals the write status check value. As discussed above, the write status check value can be stored in either a reserved file such as reserved file 346 of FIG. 5 or in a reset history table such as reset history table 348 of FIG. 7. If the write status indicator in the current sector equals the write status check value, this can mean that the current sector has already been written in the present write pass and that the sector identified by the write pointer is not the proper current sector. In other words, if the write status indicator equals the write status check value, the next sector for writing data is actually beyond the sector indicated by the write pointer. On the other hand, if it is determined in block 456 that the write status indicator equals the write status check value, it is likely that the current sector is the correct sector for sequentially writing data on disk 200. The write pointer recovery process then ends in block 458.

In other embodiments, an additional check can be performed to confirm that the value of the write status indicator in the sector immediately before the current sector does not equal the write status check value. This change in values for the write status indicators could help verify the current sector.

Blocks 459 and 460 described below seek to identify a proper current sector when controller 122 determines that the write status indicator for the current sector equals the write status check value in block 456. In block 459, controller 122 performs a check to determine an area on disk 200 where writing may have stopped. In one embodiment, this check may be performed by scanning sectors following the current sector to identify consecutive error correction code (ECC) errors which may indicate where writing stopped for a current SMR track. Since only a portion of a previous SMR track would fill an unwritten area of a current SMR track (i.e., the portion of the previous SMR track that becomes overlapped when data is written in the current SMR track), scanning the unwritten portion of the current SMR track ordinarily results in consecutive ECC errors. Other ways to determine an area where writing may have stopped are possible.

In block 460, controller 122 controls head 128 to read write status indicators in at least one sector in a range between the current sector and a last sector in order to identify the correct current sector. The last sector can be a last available sector on disk 200 or can be a last available sector for a particular zone on disk 200. In block 460, write status indicators can be scanned sequentially sector by sector. If the write status indicators are capable of distinctly indicating different write passes with multiple bits, such as in FIGS. 6B and 6C, controller 122 can search for the correct current sector by searching for a sector having a write status indicator with a different value from the write status indicator in an immediately preceding sector. Such a change in write status indicators can indicate the location of the last written sector in a current write pass and thereby identify the current sector.

In addition, if disk 200 is used for a particular application where there is no resetting of write pointers, single bit write status indicators can be used as in the example of FIG. 6A to sequentially read write status indicators in the range without reference to a reset history table. Otherwise, if write status indicators such as in FIG. 6D are used, controller 122 will refer to a reset history table to identify the correct current sector.

In other embodiments, controller 122 may perform a binary search of the write status indicators within the range of sectors until the correct current sector is identified in block 460. Performing a binary search can often identify a current sector more quickly than a sequential search of sectors. As discussed above, controller 122 may need to refer to a reset history table to identify the correct current sector if the write status indicators themselves cannot distinctly indicate different write passes.

In block 461, controller 122 determines if the correct current sector was identified in block 460. If no correct current sector was identified in block 460, controller 122 sets the write pointer to a read-only, predetermined address in block 463 as a safety measure to reduce the risk of inadvertently overwriting data on disk 200. As described above with reference to block 452, a read-only, predetermined address can correspond, for example, to a last available sector in a zone or on a disk, or to a simulated sector beyond the last available sector. The write pointer recovery process then ends in block 458.

If it is determined in block 461 that the correct current sector was identified, controller 122 updates the write pointer in block 462 to correspond to the correct current sector identified in block 460. Controller 122 in block 464 stores the write pointer as a check-pointed write pointer in a reserved file such as reserved file 346. Controller 122 may also optionally report the check-pointed write pointer to host 101 via host interface 126. The write pointer recovery process then ends in block 458.

Conclusion

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A disk drive comprising:
    a disk including a plurality of sectors for storing data;
    a non-volatile memory (NVM) for storing data;
    a head configured to read data from the disk and write data to the disk; and
    a controller configured to:
        control the head to sequentially write data sector by sector on the disk, wherein the data written in each sector includes a write status indicator indicating that data has been written in the sector;
        store a write pointer on the disk or the NVM as a check-pointed write pointer, wherein the write pointer corresponds to a current sector for writing data on the disk; and
        during a write pointer recovery process when the check-pointed write pointer is retrievable:
            retrieve the check-pointed write pointer from the disk or the NVM;
            scan at least one write status indicator in a range of sectors from the sector corresponding to the retrieved check-pointed write pointer and a last sector to identify the current sector for writing data; and
            set the write pointer to correspond to the identified current sector.

2. The disk drive of claim 1, wherein during the write pointer recovery process, the controller is further configured to sequentially scan write status indicators sector by sector in the range of sectors until the current sector is identified.

3. The disk drive of claim 2, wherein the current sector is identified when a value of the write status indicator in the current sector differs from a value of the write status indicator scanned immediately before the write status indicator in the current sector.

4. The disk drive of claim 1, wherein during the write pointer recovery process, the controller is further configured to perform a binary search of the write status indicators within the range of sectors until the current sector is identified.

5. The disk drive of claim 4, wherein the controller is further configured to:
    reset the write pointer so that the write pointer corresponds to a first sector;
    maintain a reset history table including an address for the current sector and a value for the write status indicator in the current sector before the write pointer was reset; and
    during the write pointer recovery process, use the reset history table in performing the binary search of the write status indicators in sectors within the range of sectors to identify the current sector.

6. The disk drive of claim 1, wherein the controller is further configured to:
    increment a value of the write status indicator in a sector when data is written to the sector; and
    reset the write pointer so that the write pointer corresponds to a first sector; and
    wherein during the write pointer recovery process, the current sector is identified when a value of the write status indicator in the current sector is less than a value of the write status indicator in a sector immediately preceding the current sector.

7. The disk drive of claim 1, wherein the disk includes a plurality of zones of sectors with each zone having its own write pointer.

8. The disk drive of claim 7, wherein the controller is further configured to store a write pointer as a check-pointed write pointer for a first zone when the disk drive switches from writing data in the first zone to writing data in a second zone.

9. The disk drive of claim 1, wherein the controller is further configured to store the write pointer as the check-pointed write pointer each time a predetermined amount of data has been written, each time a predetermined amount of time has expired, when the disk drive encounters an error when writing data in a sector, when the disk drive receives a host flush command, when a host connected to the disk drive has been idle for a predetermined amount of time, and/or when a firmware of the disk drive has been modified.

10. The disk drive of claim 1, wherein after the disk drive encounters an error when writing data, the controller is further configured to:
    calculate a logical block address for a next available sector by adjusting for sector data alignment for the disk and/or adjusting for a servo wedge on the disk;
    set the write pointer as the calculated logical block address; and
    control the disk drive to write the data to the current sector.

11. The disk drive of claim 1, wherein when the check-pointed write pointer is not retrievable, the controller is further configured to set the write pointer to a predetermined value such that the disk drive operates in a read-only mode.

12. The disk drive of claim 1, wherein the disk drive is connected to a host, and wherein the controller is further configured to report to the host an address corresponding to the write pointer.

13. The disk drive of claim 1, wherein the disk drive is connected to a host, and wherein the controller is further configured to set an address for the write pointer based on a command received from the host.

14. The disk drive of claim 1, wherein the disk drive is connected to a host, and wherein the controller is further configured to disable use of the write pointer in response to a command from the host.

15. The disk drive of claim 1, wherein the disk drive is connected to a host, and wherein the controller is further configured to:
   receive from the host a read command including at least one address for reading data from an area of the disk corresponding to the at least one address;
   determine from the write pointer whether the at least one address corresponds to an area of the disk before or after the current sector; and
   notify the host of a read error if the at least one address corresponds to an area after the current sector.

16. The disk drive of claim 1, wherein the disk drive is connected to a host, and wherein the controller is further configured to:
   receive from the host a write command including at least one address for writing data to an area of the disk corresponding to the at least one address;
   determine from the write pointer whether the at least one address corresponds to an area of the disk before or after the current sector; and
   notify the host of a write error if the at least one address corresponds to an area before the current sector.

17. A method of operating a disk drive including a disk having a plurality of sectors for storing data and a non-volatile memory (NVM) for storing data, the method comprising:
   sequentially writing data sector by sector on the disk, wherein the data written in each sector includes a write status indicator indicating that data has been written in the sector;
   storing a write pointer on the disk or the NVM as a check-pointed write pointer, wherein the write pointer corresponds to a current sector for writing data on the disk; and
   during a write pointer recovery process when the check-pointed write pointer is retrievable:
      retrieving the check-pointed write pointer from the disk or the NVM;
      scanning at least one write status indicator in a range of sectors from the sector corresponding to the retrieved check-pointed write pointer and a last sector to identify the current sector for writing data; and
      setting the write pointer to correspond to the identified current sector.

18. The method of claim 17, wherein during the write pointer recovery process, scanning at least one write status indicator includes sequentially scanning the write status indicators sector by sector within the range of sectors until the current sector is identified.

19. The method of claim 18, wherein the current sector is identified when a value of the write status indicator in the current sector differs from a value of the write status indicator scanned immediately before the write status indicator in the current sector.

20. The method of claim 17, wherein during the write pointer recovery process, scanning at least one write status indicator includes performing a binary search of the write status indicators within the range of sectors until the current sector is identified.

21. The method of claim 20, further comprising:
   resetting the write pointer so that the write pointer corresponds to a first sector;
   maintaining a reset history table including an address for the current sector and a value for the write status indicator in the current sector before the write pointer was reset; and
   during the write pointer recovery process, using the reset history table in performing the binary search of the write status indicators within the range of sectors to identify the current sector.

22. The method of claim 17, further comprising:
   incrementing a value of the write status indicator in a sector when data is written to the sector; and
   resetting the write pointer so that the write pointer corresponds to a first sector; and
   wherein during the write pointer recovery process, the current sector is identified when a value of the write status indicator in the current sector is less than a value of the write status indicator in a sector immediately preceding the current sector.

23. The method of claim 17, wherein the disk includes a plurality of zones of sectors with each zone having its own write pointer.

24. The method of claim 23, wherein the method further comprises storing a write pointer as a check-pointed write pointer for a first zone when the disk drive switches from writing data in the first zone to writing data in a second zone.

25. The method of claim 17, wherein storing the write pointer as the check-pointed write pointer occurs each time a predetermined amount of data has been written, each time a predetermined amount of time has expired, when the disk drive encounters an error when writing data in a sector, when the disk drive receives a host flush command, when a host connected to the disk drive has been idle for a predetermined amount of time, and/or when a firmware of the disk drive has been modified.

26. The method of claim 17, wherein after the disk drive encounters an error when writing data, the method further comprises:
   calculating a logical block address for a next available sector by adjusting for sector data alignment for the disk and/or adjusting for a servo wedge on the disk;
   setting the calculated logical block address as the write pointer; and
   writing the data to the current sector.

27. The method of claim 17, wherein the method further comprises, when the check-pointed write pointer is not retrievable, setting the write pointer to a predetermined value such that the disk drive operates in a read-only mode.

28. The method of claim 17, wherein the disk drive is connected to a host, and the method further comprises reporting to the host an address corresponding to the write pointer.

29. The method of claim 17, wherein the disk drive is connected to a host, and wherein the method further comprises setting a value for the write pointer based on a command received from the host.

30. The method of claim 17, wherein the disk drive is connected to a host, and the method further comprises disabling use of the write pointer in response to a command from the host.

31. The method of claim 17, wherein the disk drive is connected to a host, and wherein the method further comprises:
   receiving from the host a read command including at least one address for reading data from an area of the disk corresponding to the at least one address;
   determining from the write pointer whether the at least one address corresponds to an area of the disk before or after the current sector; and notifying the host of a read error if the at least one address corresponds to an area after the current sector.

32. The method of claim 17, wherein the disk drive is connected to a host, and wherein the method further comprises:
- receiving from the host a write command including at least one address for writing data to an area of the disk corresponding to the at least one address;
- determining from the write pointer whether the at least one address corresponds to an area of the disk before or after the current sector; and
- notifying the host of a write error if the at least one address corresponds to an area before the current sector.

33. A non-transitory computer-readable medium storing computer-executable instructions for operating a disk drive including a disk having a plurality of sectors for storing data and a non-volatile memory (NVM) for storing data, wherein when the computer-executable instructions are executed by a processer, the processor:
- controls the disk drive to sequentially write data sector by sector on the disk, wherein the data written in each sector includes a write status indicator indicating that data has been written in the sector;
- stores a write pointer on the disk or the NVM as a check-pointed write pointer, wherein the write pointer corresponds to a current sector for writing data on the disk; and
- during a write pointer recovery process when the check-pointed write pointer is retrievable:
  - retrieve the check-pointed write pointer from the disk or the NVM;
  - scan at least one write status indicator in a range of sectors from the sector corresponding to the retrieved check-pointed write pointer and a last sector to identify the current sector for writing data; and
  - set the write pointer to correspond to the identified current sector.

34. A disk drive connected to a host, the disk drive comprising:
- a disk including a plurality of sectors for storing data;
- a head configured to read data from the disk and write data to the disk;
- a memory storing a write pointer corresponding to a current sector for writing data on the disk;
- a host interface for receiving data from the host to be written on the disk; and
- a controller configured to:
  - control the head to sequentially write the received data sector by sector on the disk, wherein a first portion of the received data is written in the current sector and the data written in each sector includes a write status indicator indicating that data has been written in the sector; and
  - update the write pointer to correspond to a next available sector after writing the first portion of the received data in the current sector.

35. The disk drive of claim 34, wherein the write pointer is a logical block address and wherein the controller is further configured to update the write pointer by:
- calculating a next available logical block address corresponding to the next available sector; and
- setting the next available logical block address as the write pointer after writing the first portion of the received data in the current sector.

36. The disk drive of claim 35, wherein the controller calculates the next available logical block address by adjusting for sector data alignment for the disk and/or adjusting for a servo wedge on the disk.

37. The disk drive of claim 34, wherein the host interface receives a read command from the host to read data from the disk, and wherein the controller generates an error message if the read command requests data to be read from a sector beyond the current sector.

* * * * *